Figure 1:
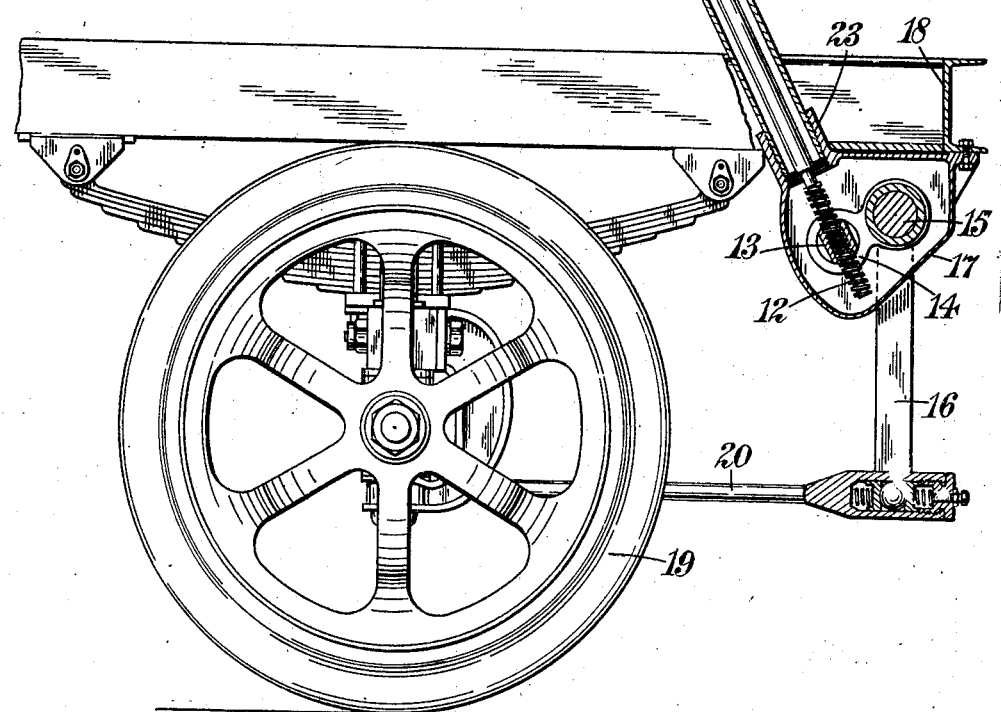

Mar. 3, 1925.

S. E. ALLEY 1,528,359

STEERING GEAR FOR VEHICLES

Filed Jan. 23, 1924   2 Sheets-Sheet 1

INVENTOR.
Stephen Evans Alley
BY Watson, Coit, Morse & Grindle
ATTYS

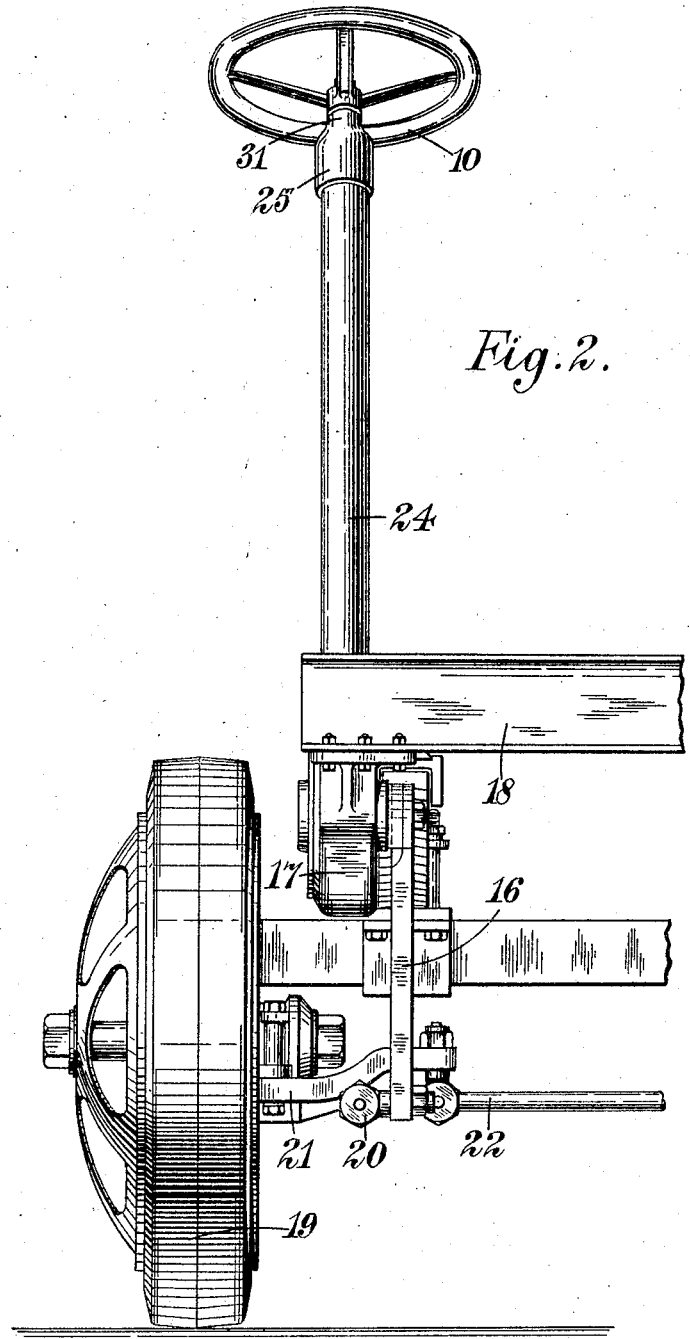

Patented Mar. 3, 1925.

1,528,359

UNITED STATES PATENT OFFICE.

STEPHEN EVANS ALLEY, OF WESTMINSTER, LONDON, ENGLAND, ASSIGNOR TO THE "SENTINEL" WAGGON WORKS (1920) LIMITED, OF WESTMINSTER, LONDON, ENGLAND, A BRITISH COMPANY.

STEERING GEAR FOR VEHICLES.

Application filed January 23, 1924. Serial No. 688,041.

*To all whom it may concern:*

Be it known that I, STEPHEN EVANS ALLEY, a subject of the King of England, residing at Westminster, London, England, have invented certain new and useful Improvements in Steering Gears for Vehicles, of which the following is a specification.

This invention is for improvements in or relating to steering gear for vehicles and has for one of its objects to provide a steering gear in which the parts are constructed with a view to simplicity, ease of assembly, and practical efficiency in operation.

According to one feature of the present invention there is provided a steering gear comprising in combination a swinging main rotary operating shaft held against movement longitudinally of its axis by a bearing at its upper end and having upon its lower end a screw-thread, a nut mounted to travel along the screwthread and connected to the spindle of a steering arm by a link of fixed actual length pivoted to turn about the axis of said spindle in following the movements of the nut, a casing in which the steering arm spindle, link, nut, and screwed lower end of the main shaft are housed, said casing being formed as an oil well so that the whole or a portion of the said parts which are housed in it may work immersed in lubricant, and a tube extending upwardly from said casing and surrounding the major portion of the length of the main shaft, said tube affording towards its upper end a portion of the bearing surface for the main shaft in which the latter pivots when bodily swinging to accommodate the movements of the link at its lower end about the spindle of the steering arm, said tube also having at its upper end a detachable cap the interior of which forms another portion of the said bearing surface for the upper end of the main shaft, and said tube and the bearing at the upper end thereof being constructed and arranged in such manner as to permit the easy introduction into the bearing, from its exterior, of oil, and after the latter has drained through the bearing, to conduct it down inside the tube to the well formed by the aforesaid casing. Thus, when once the oil well has been charged, it will be kept replenished by the normal daily oiling merely of the bearing at the upper end of the main shaft.

According to another feature of the present invention there is provided a steering gear having a swinging main shaft surrounded by a tube and held against longitudinal movement therein by a spherical bearing at the upper end of the tube and in a cap which co-operates therewith, and which is characterized in that two enlargements of the main shaft, which have convex spherical annular surfaces to engage with the aforesaid bearing, are formed integral with said main shaft. These enlargements function both in permitting the bodily swinging of the main shaft and also as the thrust bearing for the main shaft and it will be seen that in this way a very simple construction is provided which embodies but few parts.

For a more complete understanding of the invention there will now be described, by way of example only and with reference to the accompanying drawings, one constructional form of steering gear according to the invention. It is to be understood, however, that the invention is not limited to the precise constructional details set forth.

In these drawings:—

Figure 1 is a side elevation, partly in section, of a portion of the mechanism. and Figure 2 is a front elevation thereof.

Like reference numerals indicate like parts throughout the drawings.

In the construction shown the steering wheel 10 is secured to the upper end of a main shaft 11 which has at its lower end a screwed portion 12. Upon this screwed portion 12 a nut 13 is received which is carried in a link 14 mounted upon the spindle 15 of a steering drop arm 16. The spindle 15 is mounted in a casing 17 carried on the underside of the vehicle chassis 18, and the arm 16 is connected to the steering road wheels 19 by suitable rods 20, 21 and 22, the construction of which latter will not be described in detail as it does not constitute in itself part of the present invention.

The casing 17 is a closed structure and is intended to serve as an oil well so that the parts contained in the casing may work immersed in lubricant. On its upper surface the casing 17 has an internally screwed boss 23 which receives an upstanding tube 24 surrounding the major portion of the length of the shaft 11. At its upper end the tube 24 receives a screwed cap 25 held in place by a locking device 26 of any convenient construction. The upper end of the tube 24 carries inside the cap 25 a member 27 which presents a concave spherical face opposite to the end of the cap 25, and the interior of the latter is similarly shaped at 28. In this way a spherical bearing is provided for the reception of two enlargements 29 and 30 upon the shaft 11. The cap 25 is adjusted in position so that these enlargements are gripped between the spherical bearing surfaces and thus the shaft 11 will be supported with a universal bearing at its upper end, which bearing functions also as a thrust bearing.

The extreme upper end 31 of the cap 25 is cylindrical in shape and a clearance is left between its inner face and the cylindrical face of the end 32 of the shaft 11. This is necessary in order to permit the swinging of the shaft 11 as the link 14 moves about the axis of the spindle 15, and is also utilized to permit the operator to be able easily to supply oil to the upper bearing. It will be seen that oil thus supplied will drain through the bearing and pass down inside the tube 24 to the interior of the casing 17 to replenish the supply there.

From the foregoing description it will be seen that the construction according to the present invention comprises but few parts which are of a simple nature, and that the various parts can readily be assembled or dismantled and are not likely to be easily damaged or worn in operation.

The invention is, of course, not limited to the precise constructional details hereinbefore set forth.

I claim:

1. In a steering gear for motor vehicles, the combination with a main shaft having a steering wheel at its upper end and a worm at its lower end, a nut in which said worm is engaged, a link of fixed length operatively connected at one end to said nut and connected at its other end to a steering member for operating the steering wheels of the vehicle, a tubular casing having at its lower end an oil well containing said worm and nut and having at its upper end a cap, a spherical bearing within said cap through which said shaft extends, which cap has a tubular portion that is situated on the steering wheel side of the spherical bearing and surrounds the adjacent end portion of the shaft with play to accommodate the swinging movement of the shaft and to make with the shaft an annular lubricating chamber, which chamber opens at its upper end at a point spaced away from the underside of the steering wheel and is closed at its lower end by said spherical bearing, past which lubricant can drain downwards through the tubular casing into the oil well, whereby normal lubrication of the spherical bearing constantly replenishes the lubricant in the oil well which, after being once charged, requires no further attention, substantially as described.

2. In a steering gear for motor vehicles, the combination with a main shaft having a steering wheel at its upper end and a worm at its lower end, a nut in which said worm is engaged, a link of fixed length operatively connected at one end to said nut and connected at its other end to a steering member for operating the steering wheels of the vehicle, a tubular casing having at its lower end an oil well containing said worm and nut and link, and having at its upper end a cap, a spherical bearing within said cap, said main shaft having two enlargements integral with itself which have each a convex spherical annular surface arranged to engage with the said spherical bearing, which cap has a tubular portion that is situated on the steering wheel side of the spherical bearing and surrounds the adjacent end portion of said shaft with play to accommodate the swinging movement of the shaft and to make with the shaft an annular lubricating chamber, which chamber opens at its upper end at a point spaced away from the underside of the steering wheel and is closed at its lower end by said spherical bearing, past which lubricant can drain downwards through the tubular casing into the oil well, substantially as and for the purpose described.

In testimony whereof I affix my signature.

STEPHEN EVANS ALLEY.